(12) United States Patent
Goto et al.

(10) Patent No.: US 12,038,088 B2
(45) Date of Patent: Jul. 16, 2024

(54) SEALING DEVICE (71) Applicant: NOK CORPORATION, Tokyo (JP)

(72) Inventors: Kiichiro Goto, Fukushima (JP); Yuki Sano, Fukushima (JP)

(73) Assignee: NOK CORPORATION (JP)

( * ) Notice: Subject to any disclaimer, the term of this patent is extended or adjusted under 35 U.S.C. 154(b) by 225 days.

(21) Appl. No.: 17/642,267

(22) PCT Filed: Sep. 3, 2020

(86) PCT No.: PCT/JP2020/033443
§ 371 (c)(1),
(2) Date: Mar. 11, 2022

(87) PCT Pub. No.: WO2021/079631
PCT Pub. Date: Apr. 29, 2021

(65) Prior Publication Data
US 2022/0316596 A1    Oct. 6, 2022

(30) Foreign Application Priority Data
Oct. 25, 2019  (JP) .................................. 2019-193923

(51) Int. Cl.
F16J 15/34     (2006.01)
F16D 25/0638   (2006.01)
F16D 125/08    (2012.01)

(52) U.S. Cl.
CPC ....... *F16J 15/3436* (2013.01); *F16D 25/0638* (2013.01); *F16D 2125/08* (2013.01); *F16D 2300/08* (2013.01)

(58) Field of Classification Search
CPC .. F16J 15/3436; F16J 15/3232; F16J 15/3268; F16D 2125/08
See application file for complete search history.

(56) References Cited

U.S. PATENT DOCUMENTS

| 2004/0168878 A1* | 9/2004 | Yabe ....................... F16D 48/02 192/112 |
| 2009/0038907 A1* | 2/2009 | Yoshikawa ............. F16D 25/12 192/85.25 |
| 2021/0348656 A1* | 11/2021 | Goto .................... F16J 15/3204 |

FOREIGN PATENT DOCUMENTS

| JP | 2001-304363 A | 10/2001 |
| JP | 2003-194232 A | 7/2003 |

(Continued)

OTHER PUBLICATIONS

International Search Report (in English and Japanese) issued in PCT/JP2020/033443, mailed Oct. 13, 2020; ISA/JP (5 pages).

*Primary Examiner* — Christine M Mills
*Assistant Examiner* — L. Susmitha Koneru
(74) *Attorney, Agent, or Firm* — Harness, Dickey & Pierce, P.L.C.

(57) ABSTRACT

An annular sealing device in a recess in a housing has a movable annular piston; and an annular inner periphery sealing lip adhered to part of a first edge along an inner periphery of the piston and that slides while in contact with the recess. The first edge has a first inner periphery edge with a first thickness; a second inner periphery edge adjoining the first inner periphery edge and with a thinner second thickness; and a third inner periphery edge adjoining the second inner periphery edge and with a thinner yet third thickness. The first, second, and third inner periphery edges are in this order from the outer periphery of the piston. The inner periphery sealing lip is adhered to the third inner periphery edge and part of the second inner periphery edge to cover a step formed by thickness differences between the second and third inner periphery edges.

9 Claims, 6 Drawing Sheets

(56) References Cited

FOREIGN PATENT DOCUMENTS

| | | |
|---|---|---|
| JP | 2006-242311 A | 9/2006 |
| JP | 2008-045713 A | 2/2008 |
| JP | 2010-196778 A | 9/2010 |

* cited by examiner

SEALING DEVICE

CROSS REFERENCE TO RELATED APPLICATIONS

This application is a U.S. National Phase Application under 35 U.S.C. 371 of International Application No. PCT/JP2020/033443, filed on Sep. 3, 2020, which claims priority to Japanese Patent Application No. 2019-193923, filed on Oct. 25, 2019. The entire disclosures of the above applications are expressly incorporated by reference herein.

BACKGROUND

Technical Field

The present invention relates to a sealing device.

Related Art

Conventionally, sealing devices used in automatic transmissions of vehicles, such as automobiles, are known. For example, Japanese Patent Publication No. 2006-242311 describes a technology of a sealing device used in a hydraulic actuator to operate a clutch device of an automatic transmission of a vehicle. This type of sealing device includes, for example, an annular piston arranged to reciprocate in an axial direction in an annular cylinder, an annular cancel plate fixed in the cylinder, a sealing lip vulcanized and adhered to the inner and outer periphery portions of the piston, and a sealing lip vulcanized and adhered to the outer periphery portion of the cancel plate. The sealing lip is formed, for example, of a rubber-like elastic material.

Hereinafter, the piston to which the sealing lip is adhered may be referred to as a piston seal, and the cancel plate to which the sealing lip is adhered may be referred to as a canceller seal. The sealing lip of the piston seal is slidable while in close contact with the cylinder, and the sealing lip of the canceller seal is slidable while in close contact with the inner surface of the piston.

In a hydraulic actuator with a canceller seal, a compression chamber is provided between the cylinder and the piston seal, and a balance oil chamber is provided between the piston seal and the canceller seal. A return spring attached to the balance oil chamber between the piston seal and the canceller seal effects a return operation of the piston seal.

In recent years, there has been a growing demand for downsizing of automatic transmissions of vehicles to improve fuel efficiency of vehicles and for other reasons. To this end, for example, space saving of a sealing device can be conceived of by reducing a thickness of a piston or a cancel plate, and thereby reducing a size of an automatic transmission. However, if a plate thickness of the piston or the cancel plate is simply made thinner, the strength of the piston or the cancel plate may be reduced, and thus the strength of the sealing device may be degraded.

In view of the foregoing, it is an object of the present invention to achieve space saving of a sealing device while preventing or reducing any degradation in the strength of the sealing device.

SUMMARY

In order to solve the above problem, a sealing device in accordance with one aspect of the present invention is an annular sealing device arranged in an annular recessed groove formed in a storage member rotatable about an axis, and the sealing device includes: an annular first body portion movable in an axial direction along the axis; and an annular first sealing lip portion that is adhered to at least a part of a first edge portion along an inner periphery of the first body portion and that slides while in contact with an inner periphery surface of the recessed groove. The first edge portion includes: a first portion with a first thickness in the axial direction; a second portion adjoining the first portion and with a second thickness that is thinner than the first thickness in the axial direction; and a third portion adjoining the second portion and with a third thickness that is thinner than the second thickness in the axial direction, and the first portion, the second portion, and the third portion are arranged in a direction from an outer periphery to a center of the first body portion in order of the first portion, the second portion, and the third portion. The first sealing lip portion is adhered to, of the first edge portion, the third portion and at least a part of the second portion, to cover a step formed by a difference in thickness between the second portion and the third portion.

A sealing device according to another aspect of the present invention is an annular sealing device arranged in an annular recessed groove formed in a storage member rotatable about an axis. The sealing device includes: an annular body portion arranged in the recessed groove and closer to an opening of the recessed groove than an annular piston arranged in the recessed groove in an axial direction along the axis, the annular body portion being fixed to an inner periphery surface of the recessed groove; and an annular sealing lip portion that is adhered to at least a part of an edge portion along an outer periphery of the body portion and that slides on the piston. The edge portion has: a fourth portion with a fourth thickness in the axial direction; a fifth portion adjoining the fourth portion and with a fifth thickness that is thinner than the fourth thickness in the axial direction; and a sixth portion adjoining the fifth portion and with a sixth thickness that is thinner than the fifth thickness in the axial direction. The fourth portion, the fifth portion, and the sixth portion are arranged in a direction from a center to the outer periphery of the body portion in order of the fourth portion, the fifth portion, and the sixth portion, and the sealing lip portion is adhered to, of the edge portion, the sixth portion and a part of the fifth portion to cover a step formed by a difference in thickness between the fifth portion and the sixth portion.

DETAILED DESCRIPTION

In the following, description will be given of modes for carrying out the present invention with reference to the drawings. In the drawings, dimensions and scale of the parts shown may differ from those in actuality. In addition, since in the modes set out below specific preferable examples of the present invention are described, various technically preferable limitations are included in the descriptions. Unless otherwise stated in the following description, the scope of the invention is not limited to the modes set out below.

1. Embodiment

An embodiment of the present invention will be described below. First, an example of an overview of the sealing device 100 according to the embodiment will be described with reference to FIG. 1.

Figure 1:
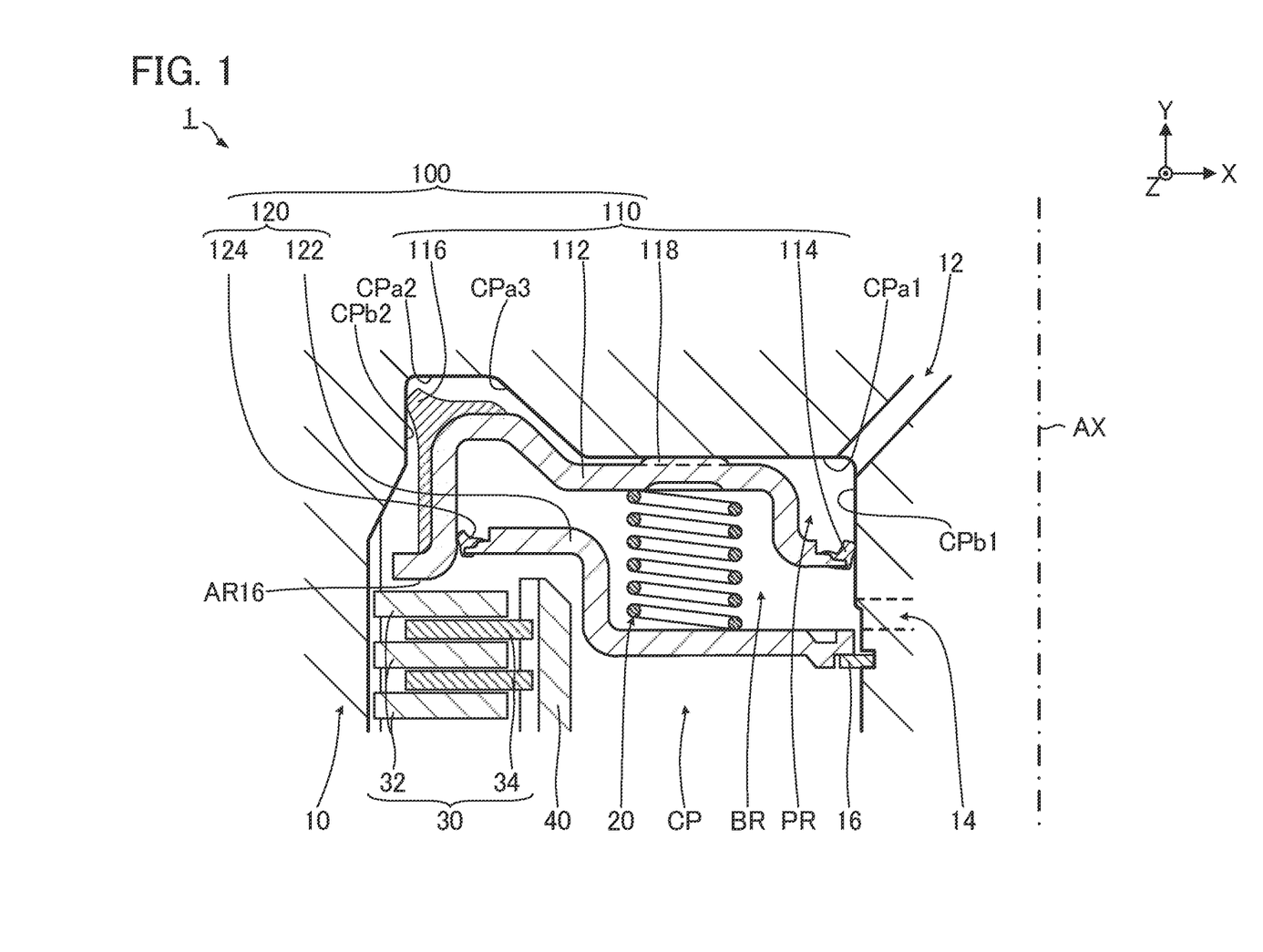
FIG. 1 is a schematic cross-sectional view of a hydraulic actuator including a sealing device according to an embodiment.

FIG. 1 is a schematic cross-sectional view of a hydraulic actuator 1 including a sealing device 100 according to the embodiment. FIG. 1 shows a schematic cross-sectional view of a main part of the hydraulic actuator 1 when cut by a plane passing through an axis AX (an example of an "axis") of a driving shaft member (not shown) (hereinafter also referred to as a driving shaft).

In the present embodiment, for convenience of explanation, a three-axis Cartesian coordinate system having mutually orthogonal X, Y, and Z axes is introduced. In the following, the direction indicated by the arrow of the X axis is referred to as a +X direction (positive X direction), and the opposite direction of the +X direction is referred to as a −X direction (negative X direction). The direction indicated by the arrow of the Y axis is referred to as a +Y direction (positive Y direction), and the opposite direction of the +Y direction is referred to as the −Y direction (negative Y direction). The direction indicated by the arrow of the Z axis is referred to as a +Z direction (positive Z direction), and the opposite direction of the +Z direction is referred to as the −Z direction (negative Z direction). In the example shown in FIG. 1, the Y axis is parallel to the axis AX. Therefore, the direction along the axis AX (an example of the "axial direction") is the +Y direction or the −Y direction. In the following, the direction along the axis AX may be referred to as a Y direction without particular distinction between the +Y direction and the −Y direction. Further, the +X direction and the −X direction may be referred to as an X direction without particular distinction therebetween.

In the present embodiment, it is assumed that the sealing device 100 is used in the hydraulic actuator 1, which operates a clutch device of an automatic transmission of a vehicle such as an automobile. For example, the hydraulic actuator 1 has an annular housing 10 attached to a driving shaft member (not shown), a sealing device 100 and a return spring 20. In the present embodiment, "annular" refers to a shape obtained by removing, from a first closed area, a second closed area inside the first closed area in plan view. Here, the phrase "plan view" refers to a view of an object from a specific direction. A "closed area" is, for example, an area surrounded by one or both of a curved line and a line segment. In the present embodiment, the phrases "adjacent to the outer periphery" and "adjacent to the inner periphery" may be used to describe a position or the like within an object having an annular shape in plan view. For example, when an object in plan view is viewed as having an annular shape obtained by removing from a first closed area enclosed by a first line, a second closed area enclosed by a second line inside the first closed area, "adjacent to the outer periphery" is "adjacent to the first line" and "adjacent to the inner periphery" is "adjacent to the second line." In the present embodiment, as an example, it is assumed that the housing 10 or the like has an annular shape when viewed in plan from the +Y direction.

The housing 10 is, for example, a cylinder rotatable about the axis AX, and is an example of a "storage member." For example, in cross-section the housing 10 is substantially U-shaped when cut by a plane passing through the axis AX. Thus, an annular recess portion CP is provided in the housing 10. The recess portion CP is an example of a "recessed groove." In the present embodiment, it is assumed that the bottom surface CPa1 of the recess portion CP adjacent to the inner periphery resides in the −Y direction relative to a position of the bottom surface CPa2 of the recess portion CP adjacent to the outer periphery. With the center of the annulus being the axis AX, "adjacent to the inner periphery" is adjacent to the axis AX, and "adjacent to the outer periphery" is remote from the axis AX.

In the example shown in FIG. 1, the bottom surfaces CPa1 and CPa2 of the recess portion CP are parallel to the X-axis, and the bottom surface CPa3 between the bottom surfaces CPa1 and CPa2 of the recess portion CP is inclined with respect to the X-axis. In the following, the bottom surfaces CPa1, CPa2, and CPa3 of the recess portion CP may be referred to as the bottom surface CPa without particular distinction therebetween.

The sealing device 100 and the return spring 20 are arranged in the recess portion CP of the housing 10. For example, the sealing device 100 has an annular piston seal 110 and an annular canceller seal 120 arranged in the recess portion CP of the housing 10. In the present embodiment, the sealing device 100 is assumed to be an example of the "sealing device," but the piston seal 110 and the canceller seal 120 are also examples of the "sealing device."

The space between the bottom surface CPa of the recess portion CP of the housing 10 and the piston seal 110 is sealed by the piston seal 110, to serve as a compression chamber PR. In addition, the space between the piston seal 110 and the canceller seal 120 is sealed by the piston seal 110 and the canceller seal 120, to serve as a balance oil chamber BR. Oil, such as lubricating oil, is supplied to the compression chamber PR, for example, via an oil passage 12 provided in the housing 10. Further, oil, such as lubricating oil, is supplied to the balance oil chamber BR, for example, via an oil passage 14 provided in the housing 10. Further, between the piston seal 110 and the canceller seal 120 there is arranged a return spring 20.

The piston seal 110 is, for example, reciprocally movable in the recess portion CP in a direction along the axis AX (Y direction). For example, the piston seal 110 has an annular piston 112; an inner periphery sealing lip 114 slidable relative to a side surface CPb1 adjacent to the axis AX, of the surface of the recess portion CP of the housing 10; an outer periphery sealing lip 116 slidable relative to a side surface CPb2 remote from the axis AX, of the surface of the recess portion CP; and a stopper 118. It is of note that, of the surface of the recess portion CP, the side surface CPb1 adjacent to the axis AX is an example of the "inner periphery surface."

The piston 112 is, for example, a metal ring formed of a metal material and is an example of a "first body portion." A clutch pressure part AR16, which is a part of the edge portion along the outer periphery of the piston 112, presses the driving plate 32 of the clutch 30 in response to the piston 112 moving in the −Y direction. In the following, the edge portion along the outer periphery of an object with an annular shape in plan view is also referred to as the edge portion of the object adjacent to the outer periphery, and the edge portion along the inner periphery of the object is also referred to as the edge portion of the object adjacent to the inner periphery.

The inner periphery sealing lip 114 and the outer periphery sealing lip 116 are formed, for example, of a rubber-like elastic material. The inner periphery sealing lip 114 is an example of the "first sealing lip portion." For example, the inner periphery sealing lip 114 is cross-linked and adhered to a portion of the piston 112 adjacent to the inner periphery and protrudes toward the compression chamber PR. Also, the outer periphery sealing lip 116 is cross-linked and adhered to a portion of the piston 112 adjacent to the outer periphery and protrudes toward the compression chamber PR. The shape and other characteristics of the portion of the piston 112 to which the inner periphery sealing lip 114 is adhered will be described below with reference to FIG. 2.

The stopper 118 abuts against the bottom surface CPa1 of the recess portion CP in response to the piston seal 110 moving in the +Y direction under the force exerted by the return spring 20. As a result, the stopper 118 stops the piston seal 110 from moving in the +Y direction. In the example shown in FIG. 1, the stopper 118 is formed by rounding outward a part of a surface of the piston 112 in the +Y direction, with another part of the piston adjacent to the balance oil chamber BR being arched in/rounded inward.

Figure 2:
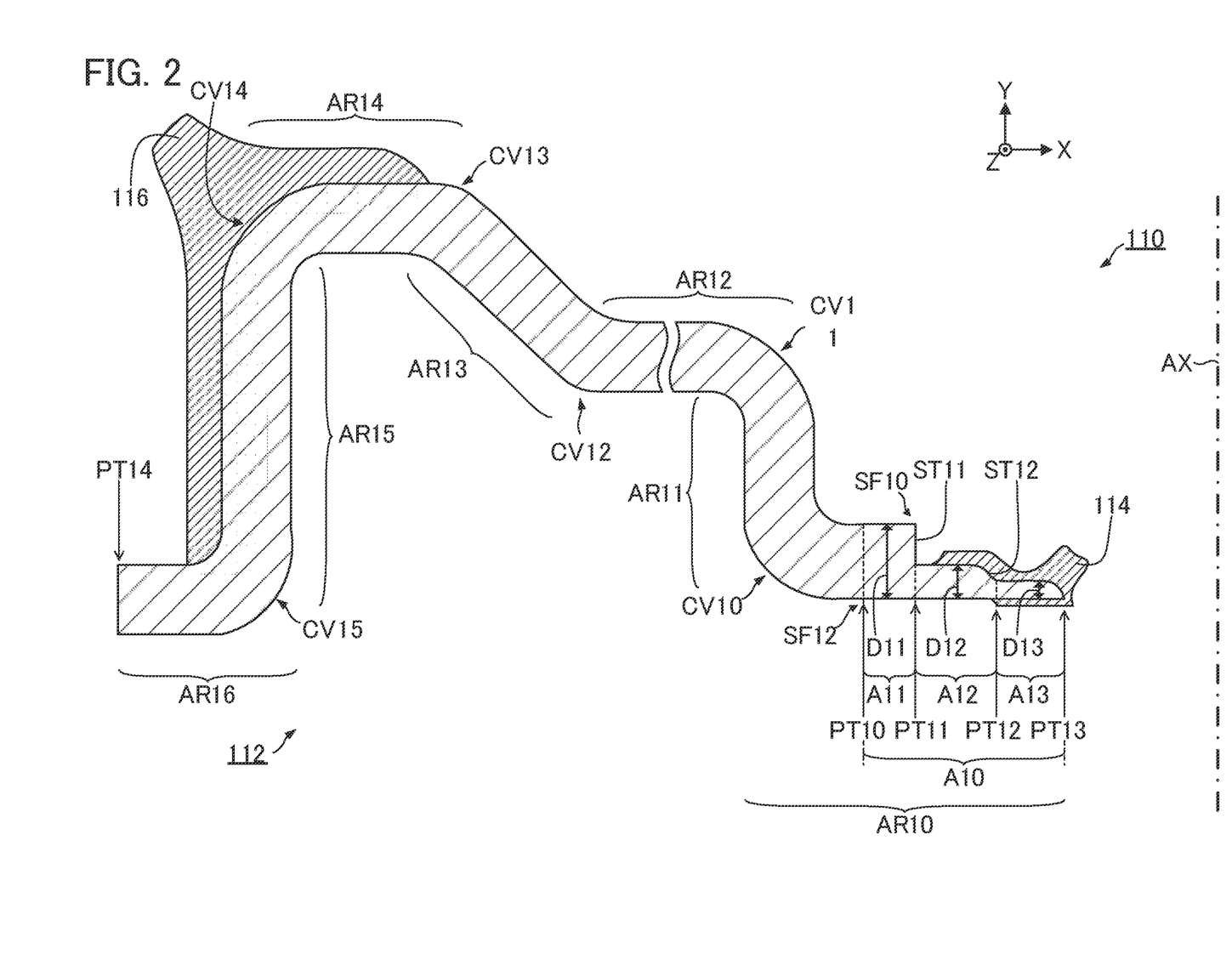
FIG. 2 is a schematic cross-sectional view of a piston seal shown in FIG. 1.

The canceller seal 120 comprises an annular cancel plate 122 that is positioned closer to the opening of the recess portion CP (in the −Y direction in the example shown in FIG. 1) than the piston 112 in the Y direction, and an annular outer periphery sealing lip 124 that slides while in contact with the piston 112 (more specifically, while in contact with the protruding portion AR15 shown in FIG. 2), the annular outer periphery sealing lip 124 being adhered to a portion of the cancel plate 122 adjacent to the outer periphery.

The cancel plate 122 is, for example, a metal ring formed of a metal material, and is an example of a "second body portion" and a "body portion." For example, the cancel plate 122 is fixed by way of a snap ring 16 mounted to an annular groove provided in the side surface CPb1 of the recess portion CP, to prevent the cancel plate 122 from moving in a direction (−Y direction) approaching the opening of the recess portion CP. In other words, the cancel plate 122 is arranged in the recess portion CP, and fixed to the side surface CPb1 of the recess portion CP.

The outer periphery sealing lip 124 is an example of a "second sealing lip portion" and a "sealing lip portion." For example, the outer periphery sealing lip 124 is formed of a rubber-like elastic material and is cross-linked and adhered to a portion of the cancel plate 122 adjacent to the outer periphery. The outer periphery sealing lip 124 protrudes toward the balance oil chamber BR. The shape, etc. of the cancel plate 122 at the portion where the outer periphery sealing lip 124 is adhered will be described below with reference to FIG. 4. Next, an overview of an operation of the hydraulic actuator 1 will be described.

The hydraulic actuator 1 reciprocates the piston 112 in the direction along the axis AX (Y direction), to operate the clutch device. For example, the clutch 30 has a driving plate 32 and a driven plate 34 arranged alternately in the Y direction. The driving plate 32 is, for example, arranged movably in the Y-direction in the recess portion CP. It is of note that the driving plate 32 is provided so as not to move relative to the recess portion CP in the circumferential direction of a circle centered about the axis AX. Therefore, the driving plate 32 rotates in conjunction with the housing 10 when the housing 10 rotates about the axis AX. The driven plate 34 is movable in the Y direction relative to a clutch hub 40 that is fixed, for example, to a driven shaft (not shown). The driven plate 34 is provided so as not to move relative to the clutch hub 40 in the circumferential direction of a circle centered about the driven shaft.

For example, the hydraulic actuator 1 supplies lubricating oil to the compression chamber PR via the oil passage 12, thereby applying hydraulic pressure to the piston 112, etc. This causes the piston 112 to move in the −Y direction (in the direction of increasing the volume of the compression chamber PR), and as a result, the clutch pressure part AR16 of the piston 112 presses the driving plate 32 of the clutch 30. In response to the driving plate 32 being pressed, the driving plate 32 and the driven plate 34 are brought into a frictional engagement with each other, thereby bringing the clutch 30 into a connected state.

In response to the driving plate 32 rotating about the axis AX, the driven plate 34 and the clutch hub 40 also rotate about the axis AX, with the clutch 30 in a connected state. In addition, since the clutch hub 40 is fixed to the driven shaft, the driven shaft also rotates in response to rotation of the clutch hub 40 about the axis AX. Therefore, when the clutch 30 is brought into the connected state, the driven shaft also rotates in response to rotation of the housing 10 (driver side), whereby power is transmitted from the driving shaft to the driven shaft.

When the piston 112 is moved in the −Y direction, i.e., when the clutch 30 is in the connected state, the return spring 20 is compressed by the piston 112. For this reason, in response to release of hydraulic pressure to the compression chamber PR when the clutch 30 is in the connected state, the piston 112 moves in the +Y direction (in the direction that reduces the volume of the compression chamber PR) due to repulsion of the compressed return spring 20. As a result, the pressure imparted to the driving plate 32 of the clutch 30 by the clutch pressure part AR16 of the piston 112 is released, followed by release of the frictional engagement between the driving plate 32 and the driven plate 34 in the clutch 30. As a result, power transmission from the driving shaft to the driven shaft is cut off.

The housing 10, the piston 112, and the cancel plate 122 rotate in conjunction with the driving shaft. Therefore, the oil supplied to the compression chamber PR is pressed toward an area adjacent to the outer periphery under centrifugal force. As a result, centrifugal hydraulic pressure is generated in the compression chamber PR. The centrifugal hydraulic pressure generated in the compression chamber PR acts to increase the volume of the compression chamber PR. Thus, the centrifugal hydraulic pressure generated in the compression chamber PR acts to prevent return of the piston 112 by the return spring 20.

The oil supplied to the balance oil chamber BR through the oil passage 14 is also pressed toward an area adjacent to the outer periphery under centrifugal force in substantially the same way as the oil supplied to the compression chamber PR. For this reason, centrifugal oil pressure is also generated in the balance oil chamber BR, the centrifugal oil pressure being substantially the same as that generated in the compression chamber PR. The centrifugal oil pressure generated in the balance oil chamber BR acts to increase the volume of the balance oil chamber BR. Therefore, in the hydraulic actuator 1 with the balance oil chamber BR, return of the piston 112 by the return spring 20 is smoothly carried out in response to release of the hydraulic pressure to the compression chamber PR. As a result, the clutch 30 is smoothly disconnected. Next, a shape, etc., of the piston 112 will be described with reference to FIG. 2.

FIG. 2 is a schematic cross-sectional view of the piston seal 110 shown in FIG. 1. In FIG. 2, the stopper 118 in FIG. 1 is not shown, so as to facilitate ease of viewing of the figure.

The piston 112 is formed by punch press forming, etc., of a metal plate, such as a steel plate. For example, the piston 112 has a pressure receiving part AR10 extending from a tip PT13 of the piston 112 to a bent portion CV10, the tip PT13 being adjacent to the inner periphery, a pressure receiving part AR11 extending from the bent portion CV10 to a bent portion CV11, a pressure receiving part AR12 extending from the bent portion CV11 to a bent portion CV12, and a pressure receiving part AR13 extending from the bent portion CV12 to a bent portion CV13, and a pressure receiving part AR14 extending from the bent portion CV13 to the bent portion CV14. Further, the piston 112 includes a protruding portion AR15 extending from the bent portion CV14 to the bent portion CV15 and the clutch pressure part AR16 extending from the bent portion CV15 to a tip PT14 of the piston 112 adjacent to the outer periphery.

In the example shown in FIG. 2, the pressure receiving part AR10 is located in the −Y direction relative to the pressure receiving part AR12, and the pressure receiving part AR12 is located in the −Y direction relative to the pressure receiving part AR14. In addition, the pressure receiving parts AR10, AR12 and AR14 are parallel to the X-axis. The pressure receiving part AR11 is parallel to the Y-axis (a direction along the side surfaces CPb1 and CPb2 of the recess portion CP), and the pressure receiving part AR13 is inclined relative to the X-axis and the Y-axis. In addition, a portion including the pressure receiving parts AR12, AR13, and AR14 (the portion extending from the bent portion CV11 to the bent portion CV14) is, for example, shaped to be in line with the bottom surface CPa of the recess portion CP.

The pressure receiving part AR14 is located in the −Y direction relative to the clutch pressure part AR16. In addition, the protruding portion AR15 is parallel to the Y-axis (a direction along the side surfaces CPb1 and CPb2 of the recessed portion CP). Thus, the protruding portion AR15 protrudes in a direction (−Y direction) approaching the opening of the recess portion CP from the bent portion CV14 (the edge portion of the pressure receiving part AR14 adjacent to the outer periphery). As shown in FIG. 1, the outer periphery sealing lip 124 of the canceller seal 120 slides on the protruding portion AR15. Also, in the example shown in FIG. 2, the outer periphery sealing lip 116 is adhered to the protruding portion AR15 and a part of the pressure receiving part AR14. Thus, the outer periphery surface of the bent portion CV14 is covered by the outer periphery sealing lip 116.

The clutch pressure part AR16 protrudes in a direction from the bent portion CV15 toward a portion of the piston 112 adjacent to the outer periphery (i.e., in a direction toward the side surface CPb2 of the recess portion CP, i.e., the −X direction in FIG. 2). Thus, the portion of the piston 112 adjacent to the outer periphery functions as the clutch pressure part AR16. On the other hand, the inner periphery sealing lip 114 is adhered to the edge portion A10 of the piston 112 adjacent to the inner periphery. In the example shown in FIG. 2, the edge portion A10 of the piston 112 adjacent to the inner periphery is included in the pressure receiving part AR10.

The edge portion A10 of the piston 112 adjacent to the inner periphery has a first inner periphery edge portion A11 with a thickness D11 in the Y direction (the direction along the axis AX), a second inner periphery edge portion A12 with a thickness D12 thinner than the thickness D11 in the Y direction, and a third inner periphery edge portion A13 with a thickness D13 thinner than the thickness D12 in the Y direction. For example, a portion of the first inner periphery edge portion A11 adjacent to the inner periphery is connected to a portion of the second inner periphery edge portion A12 adjacent to the outer periphery, and a portion of the second inner periphery edge portion A12 adjacent to the inner periphery is connected to a portion of the third inner periphery edge portion A13 adjacent to the outer periphery. In this manner, the second inner periphery edge portion A12 adjoins the first inner periphery edge portion A11, and the third inner periphery edge portion A13 adjoins the second inner periphery edge portion A12. The first inner periphery edge portion A11, the second inner periphery edge portion A12, and the third inner periphery edge portion A13 are arranged in the order of the first inner periphery edge portion A11, the second inner periphery edge portion A12 and the third inner periphery edge portion A13, for example, in a direction from the outer periphery to the center of the piston 112.

The inner periphery sealing lip 114 is adhered to, of the edge portion A10 of the piston 112 adjacent to the inner periphery, the third inner periphery edge portion A13 and a part of the second inner periphery edge portion A12, to cover a step ST12 formed by a difference in thickness between the second inner periphery edge portion A12 and the third inner periphery edge portion A13. Thus, the inner periphery sealing lip 114 is adhered to at least a part of the edge portion A10 along the inner periphery of the piston 112.

The edge portion A10 is an example of a "first edge portion." In addition, the thickness D11 is an example of a "first thickness," the thickness D12 is an example of a "second thickness," and the thickness D13 is an example of a "third thickness." Also, the first inner periphery edge portion A11 is an example of a "first portion," the second inner periphery edge portion A12 is an example of a "second portion," and the third inner periphery edge portion A13 is an example of a "third portion."

To otherwise describe the characteristics of the above-described edge portion A10, on the edge portion A10 of the piston 112 adjacent to the inner periphery there are provided steps ST11 and ST12 at respective positions PT11 and PT12, the position PT11 being closer to the outer periphery than a portion to which the inner periphery sealing lip 114 is adhered and the position ST12 being closer to the inner periphery than the position PT11. It is of note that the step ST11 is a step formed by a difference in thickness between the first inner periphery edge portion A11 and the second inner periphery edge portion A12. Thus, the edge portion A10 has a surface SF10 (the upper surface in FIG. 2) and a surface SF12 (the lower surface in FIG. 2) on the opposite side of the surface SF10, the surface SF10 including the steps ST11 and ST12. The surface SF10 is an example of a "first surface," and the surface SF12 is an example of a "second surface." It is of note that the surface SF10 is located between the surface SF12 and the bottom surface CPa of the recess portion CP. In other words, the steps ST11 and ST12 are provided on a surface closer to the compression chamber PR (a surface facing toward the +Y direction). The step ST12 at the position PT12 is covered by the inner periphery sealing lip 114. Further, for example, the position PT10 is located between the position PT11 and the bent portion CV10, and the thickness D11 is a thickness in the Y direction at a position between the position PT10 and the position PT11. The thickness D12 is a thickness in the Y direction at a position between the position PT11 and the position PT12, and the thickness D13 is a thickness in the Y direction at a position between the position PT12 and the tip PT13.

The thickness (thickness in the Y direction) of the edge portion A10 of the piston 112 adjacent to the inner periphery affects the durability (strength of the metal ring) of the piston 112 to a lesser degree than the thickness of the portion from the bent portion CV10 to the tip PT14 (the pressure receiving parts AR11, AR12, AR13, the protruding portion AR15, and the clutch pressure part AR16). For example, the thickness of the portion from the bent portion CV10 to the tip PT14 (e.g., the thickness in the Y direction of the pressure receiving part AR12 and that of the clutch pressure part AR16, etc.) is the same as or substantially the same as the thickness D11. Thus, in the present embodiment, the thickness of the portion affecting the durability of the piston 112 is greater than the thickness D12 of the second inner periphery edge portion A12 to which the inner periphery sealing lip 114 is adhered. Therefore, in the present embodiment, it is possible to prevent or reduce degradation of the durability of the piston 112.

Figure 5:
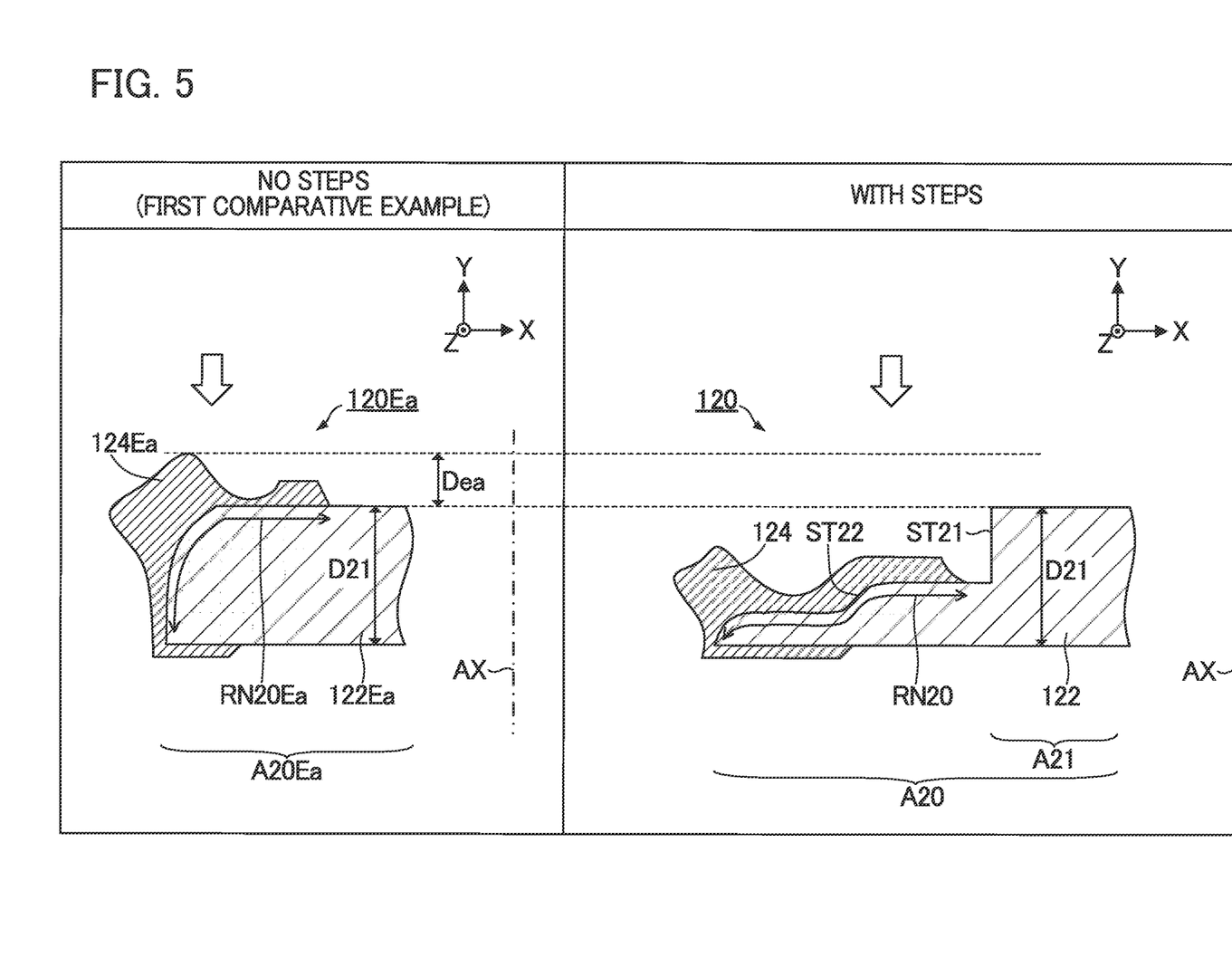
FIG. 5 is an explanatory diagram for describing differences between the canceller seal shown in FIG. 1 and a first comparative example.

Further, in the present embodiment, the inner periphery sealing lip 114 is provided to cover, from among the two steps ST11 and ST12, only the step ST12, which is closer to the inner periphery, and not to cover the step ST11, the two steps ST11 and ST12 being formed on the edge portion A10 of the piston 112 adjacent to the inner periphery. For this reason, in the present embodiment, it is possible to reduce the dimension of the inner periphery sealing lip 114 in the Y-direction as compared to a configuration in which the steps ST11 and ST12 are not formed on the edge portion A10 of the piston 112 adjacent to the inner periphery. With reference to FIG. 5, description will be given, using the canceller seal 120 as an example, of the differences between the present embodiment and a configuration (first comparative example) in which no step is formed in the portion to which a sealing lip, such as the inner periphery sealing lip 114, is adhered.

As described above, in the present embodiment, since the dimension in the Y direction of the inner periphery sealing lip 114 can be reduced, it is possible to achieve space saving of the piston seal 110. In other words, in the present embodiment, it is possible to save space taken up by the piston seal 110 while preventing or reducing degradation of the strength of the piston seal 110.

It is of note that the configuration of the piston seal 110 and the shape of the piston 112 are not limited to the example shown in FIG. 2. For example, a coating layer that is formed in a single body with the outer periphery sealing lip 116 made of a rubber-like elastic material may be cross-linked and adhered to the pressure receiving parts AR12, AR13, and AR14.

The thickness D11 may be the maximum thickness in the Y-direction of the first inner periphery edge portion A11, the thickness D12 may be the maximum thickness in the Y direction of the second inner periphery edge portion A12, and the thickness D13 may be the maximum thickness in the Y direction of the third inner periphery edge portion A13.

Figure 3:
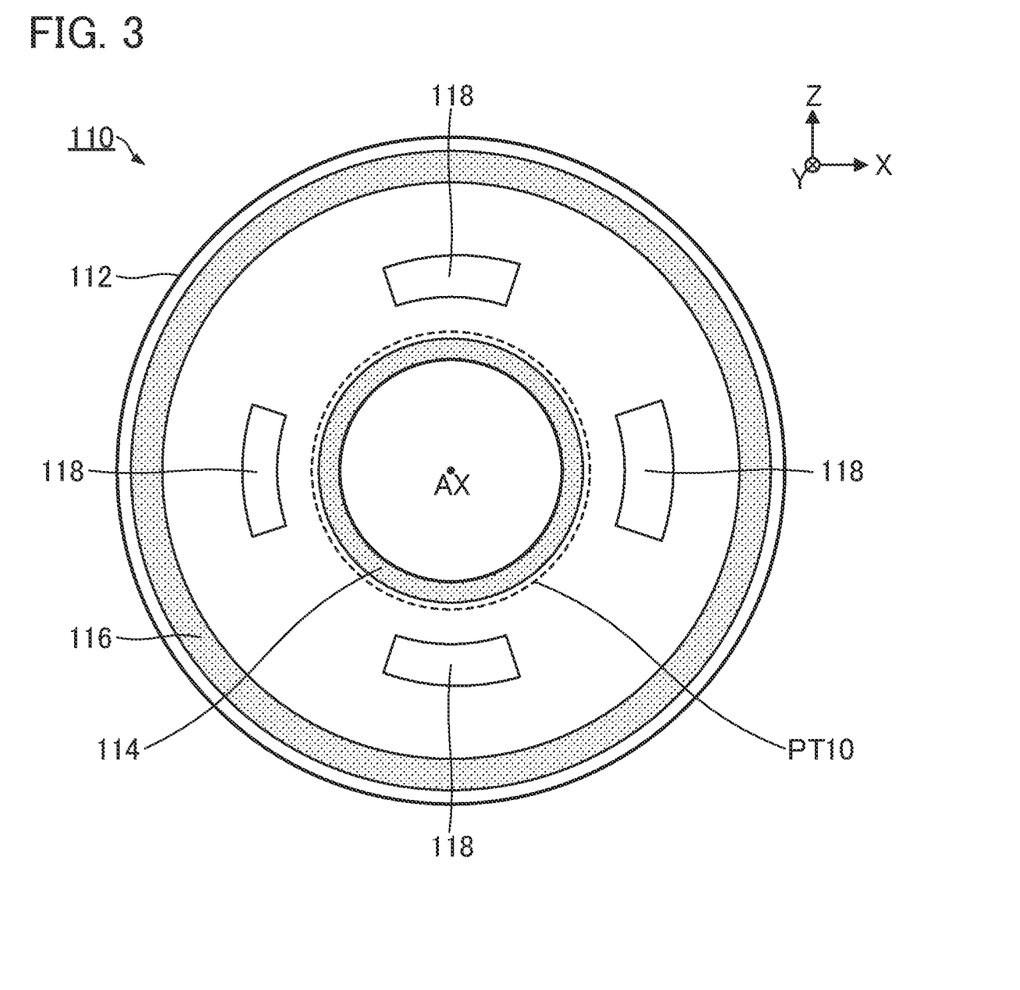
FIG. 3 is a front view of the piston seal shown in FIG. 1, viewed from the +Y direction.

FIG. 3 is a front view of the piston seal 110 shown in FIG. 1 viewed from the +Y direction. In plan view from the +Y direction, each of the piston 112, the inner periphery sealing lip 114, and the outer periphery sealing lip 116 is seen as a disk shape with a hole in the center. In other words, in plan view from the +Y direction the piston seal 110 is seen as a disk shape with a hole in the center. The dashed line in FIG. 3 indicates the position PT10 shown in FIG. 2. In other words, of the piston 112, an area closer to the inner periphery than the position PT10 corresponds to the edge portion A10 of the piston 112 adjacent to the inner periphery. Multiple stoppers 118 are formed at predetermined intervals in the circumferential direction of a circle centered about the axis AX. Similarly to the piston seal 110, in plan view from the +Y direction, each of the cancel plate 122 and the outer periphery sealing lip 124 is seen as a disk shape with a hole in the center. Description will next be given of the shape, etc., of the cancel plate 122 will be described with reference to FIG. 4.

Figure 4:
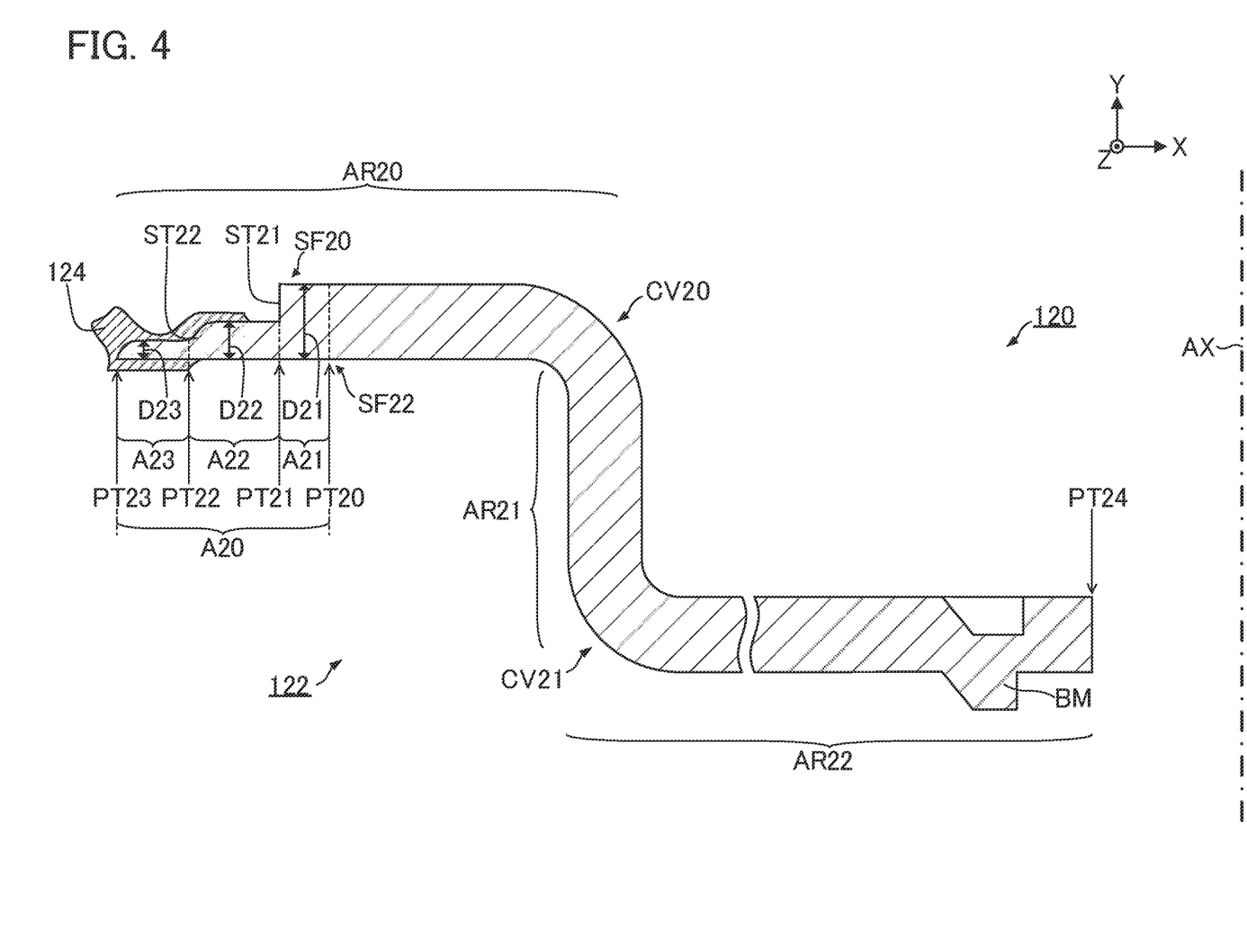
FIG. 4 is a schematic cross-sectional view of a canceller seal shown in FIG. 1.

FIG. 4 is a schematic cross-sectional view of the canceller seal 120 shown in FIG. 1.

The cancel plate 122 is formed by punch press forming or the like of a metal plate, such as a steel plate. For example, the cancel plate 122 includes an outer periphery portion AR20, a side surface portion AR21, a spring receiving part AR22, and a protruding portion BM. The outer periphery portion AR20, which is a portion extending from the tip PT23 adjacent to the outer periphery to the bent portion CV20 of the cancel plate 122, is located in the +Y direction relative to the spring receiving part AR22, which is a portion extending from the bent portion CV21 to the tip PT24 of the cancel plate 122 adjacent to the inner periphery. The outer periphery portion AR20 is connected to the spring receiving part AR22 by way of the side surface portion AR21. The side surface portion AR21 extends from the bent portion CV20 to the bent portion CV21 along the Y direction (the direction along the side surface CPb1 of the recess portion CP). In the example shown in FIG. 4, the outer periphery portion AR20 and the spring receiving part AR22 are parallel to the X-axis.

The return spring 20 shown in FIG. 1 is arranged in the spring receiving part AR22. In addition, as shown in FIG. 1, the edge portion of the spring receiving part AR22 adjacent to the inner periphery (the edge portion of the cancel plate 122 adjacent to the inner periphery) is fixed by way of the snap ring 16 mounted to an annular groove provided in the side surface CPb1 of the recess portion CP, so as not to move in the −Y direction. Further, there is provided on a portion of the spring receiving part AR22 adjacent to the inner periphery, the protruding portion BM, which protrudes in the −Y direction. The protruding portion BM prevents the snap ring 16 shown in FIG. 1 from being displaced from the housing 10.

The outer periphery sealing lip 124 is adhered to the edge portion A20 of the cancel plate 122 adjacent to the outer periphery. In the example shown in FIG. 4, the edge portion A20 of the cancel plate 122 adjacent to the outer periphery is included in the outer periphery portion AR20.

The edge portion A20 of the cancel plate 122 adjacent to the outer periphery has a first outer periphery edge portion A21 with a thickness D21 in the Y direction (in the direction along the axis AX), a second outer periphery edge portion A22 with a thickness D22 that is less than the thickness D21 in the Y direction, and a third outer periphery edge portion A23 with a thickness D23 that is less than the thickness D22 in the Y direction. For example, a portion of the first outer periphery edge portion A21 adjacent to the outer periphery is connected to a portion of the second outer periphery edge portion A22 adjacent to the inner periphery. A portion of the second outer periphery edge portion A22 adjacent to the outer periphery is connected to the third outer periphery edge portion A23 adjacent to the inner periphery. Thus, the second outer periphery edge portion A22 adjoins the first outer periphery edge portion A21, and the third outer periphery edge portion A23 adjoins the second outer periphery edge portion A22. The first outer periphery edge portion A21, the second outer periphery edge portion A22, and the third outer periphery edge portion A23 are arranged in the order of the first outer periphery edge portion A21, the second outer periphery edge portion A22, and the third outer periphery edge portion A23, for example, in a direction from the center to the outer periphery of the cancel plate 122.

The outer periphery sealing lip 124 is adhered, of the edge portion A20 of the cancel plate 122 adjacent to the inner periphery, to the third outer periphery edge portion A23 and a part of the second outer periphery edge portion A22, to cover a step ST22 formed by the difference in thickness between the second outer periphery edge portion A22 and the third outer periphery edge portion A23. Thus, the outer periphery sealing lip 124 is adhered to at least a part of the edge portion A20 along the outer periphery of the cancel plate 122.

The edge portion A20 is an example of a "second edge portion." The thickness D21 is an example of a "fourth thickness," the thickness D22 is an example of a "fifth thickness," and the thickness D23 is an example of a "sixth thickness." Further, the first outer periphery edge portion A21 is an example of a "fourth portion," and the second outer periphery edge portion A22 is an example of a "fifth portion," and the third outer periphery edge portion A23 is an example of a "sixth portion."

To otherwise describe the characteristics of the above-described edge portion A20, on the edge portion A20 of the cancel plate 122 adjacent to the outer periphery there are provided steps ST21 and ST22 at respective positions PT21 and PT22, the position PT21 being closer to the inner periphery than a portion to which the outer periphery sealing lip 124 is adhered, and the step ST22 being closer to the outer periphery than the position PT21. The step ST21 is a step formed by a difference in thickness between the first outer periphery edge portion A21 and the second outer periphery edge portion A22. Thus, the edge portion A20 has a surface SF20 (the upper surface in FIG. 4) and a surface SF22 (the lower surface in FIG. 4) on the opposite side of the surface SF20, the surface SF20 including the steps ST21 and ST22. The surface SF20 is an example of a "third surface," and the surface SF22 is an example of a "fourth surface." The surface SF20 is located between the surface SF22 and the bottom surface CPa of the recess portion CP. In other words, the steps ST21 and ST22 are provided on a surface closer to the balance oil chamber BR (a surface facing toward the +Y direction). The step ST22 at the position PT22 is covered by the outer periphery sealing lip 124. Further, for example, the position PT20 is located between the position PT21 and the bent portion CV20, and the thickness D21 is a thickness in the Y direction at a position between the position PT20 and the position PT21. The thickness D22 is a thickness in the Y direction at a position between the position PT21 and the position PT22, and the thickness D23 is a thickness in the Y direction at a position between the position PT22 and the tip PT23.

The thickness (thickness in the Y direction) of the edge portion A20 of the cancel plate 122 adjacent to the outer periphery affects the durability (strength of the metal ring) of the cancel plate 122 to a lesser degree than the thickness of the portion from the bent portion CV20 to the tip PT24 (the side surface portion AR21 and the spring receiving part AR22). For example, the thickness of the portion from the bent portion CV20 to the tip PT24 (e.g., the thickness in the Y direction of the spring receiving part AR22, etc.) is the same as or substantially the same as the thickness D21. Thus, in the present embodiment, the thickness of the portion affecting the durability of the cancel plate 122 is greater than the thickness D22 of the second outer periphery edge portion A22 to which the outer periphery sealing lip 124 is adhered. Therefore, in the present embodiment, it is possible to prevent or reduce degradation of the durability of the cancel plate 122.

Further, in the present embodiment, the outer periphery sealing lip 124 is provided to cover, from among the two steps ST21 and ST22, only the step ST22, which is closer to the outer periphery of the cancel plate 122, and not to cover the step ST21, the two steps ST21 and ST22 being formed on the edge portion A20 of the cancel plate 122 adjacent to the outer periphery. For this reason, in the present embodiment, it is possible to reduce the dimension of the outer periphery sealing lip 124 in the Y direction compared to a configuration in which the steps ST21 and ST22 are not formed on the edge portion A20 of the cancel plate 122 adjacent to the outer periphery. With reference to FIG. 5, description will be given of the differences between the present embodiment and a configuration (first comparative example) in which neither the step ST21 nor the step ST22 is formed in the edge portion A20 of the cancel plate 122.

As described above, in the present embodiment, since the dimension in the Y direction of the outer periphery sealing lip 124 can be reduced, it is possible to achieve saving of the space taken up by the canceller seal 120. In other words, in the present embodiment, it is possible to save space taken up by the canceller seal 120 while preventing or reducing degradation of the strength of canceller seal 120.

It is of note that the configuration of the canceller seal 120 and the shape of the cancel plate 122 are not limited to the example shown in FIG. 4. For example, the thickness D21 may be the maximum thickness in the Y direction of the first outer periphery edge portion A21. The thickness D22 may be the maximum thickness in the Y direction of the second outer periphery edge portion A22, and the thickness D23 may be the maximum thickness in the Y direction of the third outer periphery edge portion A23.

FIG. 5 is an explanatory diagram showing the differences between the canceller seal 120 shown in FIG. 1 and the first comparative example. The white arrows in FIG. 5 indicate the direction of the hydraulic pressure. In the canceller seal 120Ea of the first comparative example, no steps ST21 and ST22 are formed in the edge portion A20Ea of the cancel plate 122Ea adjacent to the outer periphery. For this reason, in the canceller seal 120Ea, the outer periphery sealing lip 124Ea protrudes from the outer periphery edge portion A20Ea of the cancel plate 122Ea adjacent to the outer periphery in the +Y direction by a length Dea.

In contrast, in the present embodiment, the steps ST21 and ST22 are formed on the outer periphery edge portion A20 of the cancel plate 122, so that the outer periphery sealing lip 124 stays within a position in the −Y direction relative to a surface that faces toward the +Y direction, of the first outer periphery edge portion A21 of the edge portion A20. Therefore, in the present embodiment, the dimension in the Y-direction of the outer periphery sealing lip 124 can be made smaller than that in the first comparative example. In the example shown in FIG. 5, the canceller seal 120 enables a reduction in the dimension in the Y-direction of the outer periphery sealing lip 124 compared to the canceller seal 120Ea of the first comparative example by a length Dea.

It is of note that, for example, in the first comparative example, in a case in which the thickness of the cancel plate 122Ea is thinned throughout, the outer periphery sealing lip 124 can be made smaller in the Y-direction, but the strength of the cancel plate 122Ea will be reduced. For this reason, in the first comparative example, in a case in which the thickness of the cancel plate 122Ea is made thinner throughout in order to save space taken up by the canceller seal 120Ea, the shape of the cancel plate 122Ea is deformed, resulting in interference with periphery parts and reduced pressure resistance.

In the present embodiment, for example, the first outer periphery edge portion A21 of the edge portion A20 of the cancel plate 122 adjacent to the outer periphery has the thickness D21, and the thickness D21 is the same as the thickness D21 of the edge portion A20Ea of the cancel plate 122Ea adjacent to the outer periphery, of the first comparative example. In other words, in the present embodiment, without changing the thickness of the portion that affects the durability of the cancel plate 122 from that in the first comparative example, the two steps ST21 and ST22 are formed on the edge portion A20 of the cancel plate 122 adjacent to the outer periphery (near the portion to which the outer periphery sealing lip 124 is adhered). Further, the outer periphery sealing lip 124 formed from a rubber-like elastic material is cross-linked and adhered to the cancel plate 122, to cover the first step ST22, which is the step closest to the outer periphery.

Therefore, in the present embodiment, without changing the thickness of the portion that affects the durability of the cancel plate 122 from that in the first comparative example, it is possible to reduce the dimension of the outer periphery sealing lip 124 in the Y direction. Accordingly, in the present embodiment, it is possible to maintain the strength of the canceller seal 120 and to save space taken up by the canceller seal 120.

Further, in the present embodiment, it is possible to increase the adhesion area (i.e., the baking area of the rubber) between the outer periphery sealing lip 124 and the cancel plate 122 at a portion that receives the hydraulic pressure. For example, a length RN20 in FIG. 5 is the length of a portion that receives hydraulic pressure in the adhered portion between the outer periphery sealing lip 124 and the cancel plate 122 in a cross-section of the canceller seal 120 when cut by a plane passing through the axis AX. Similarly, a length RN20Ea in FIG. 5 is the length of a portion that receives hydraulic pressure in the adhered portion between the outer periphery sealing lip 124Ea and the cancel plate 122Ea in the cross-section of the canceller seal 120Ea when cut by a plane passing through the axis AX.

For example, in the present embodiment, the length RN20 corresponding to the baking area of the outer periphery sealing lip 124 is made greater than the length RN20Ea corresponding to the baking area of the outer periphery sealing lip 124Ea in the first comparative example. As a result, it is possible to increase the adhesion area between the outer periphery sealing lip 124 and the cancel plate 122 compared to that in the first comparative example. Therefore, in the present embodiment, compared with the first comparative example, it is possible to stabilize adhesion between the outer periphery sealing lip 124 and the cancel plate 122, and also to improve pressure resistance of the outer periphery sealing lip 124.

Further, for example, in the first comparative example, of the cancel plate 122Ea, a portion to which the outer periphery sealing lip 124Ea is adhered has a surface that receives hydraulic pressure, and this surface is smooth due to omission of a step. In contrast, in the present embodiment, of the cancel plate 122, a portion to which the outer periphery sealing lip 124 is adhered has a surface that receives hydraulic pressure, and this surface has a more complicated shape due to provision of a step ST22 than that of the first comparative example. For this reason, in the present embodiment, the outer periphery sealing lip 124 is more resistant to peel off compared to that in the first comparative example. In other words, the present embodiment improves the adhesion strength between the outer periphery sealing lip 124 and the cancel plate 122, compared to the first comparative example. Next, referring to FIG. 6, description will be given of differences between the present embodiment and a canceller seal 120Eb in the second comparative example. In the canceller seal 120Eb in the second comparative example, there is formed a single step ST21Eb on the edge portion A20Eb of a cancel plate 122Eb adjacent to the outer periphery.

Figure 6:
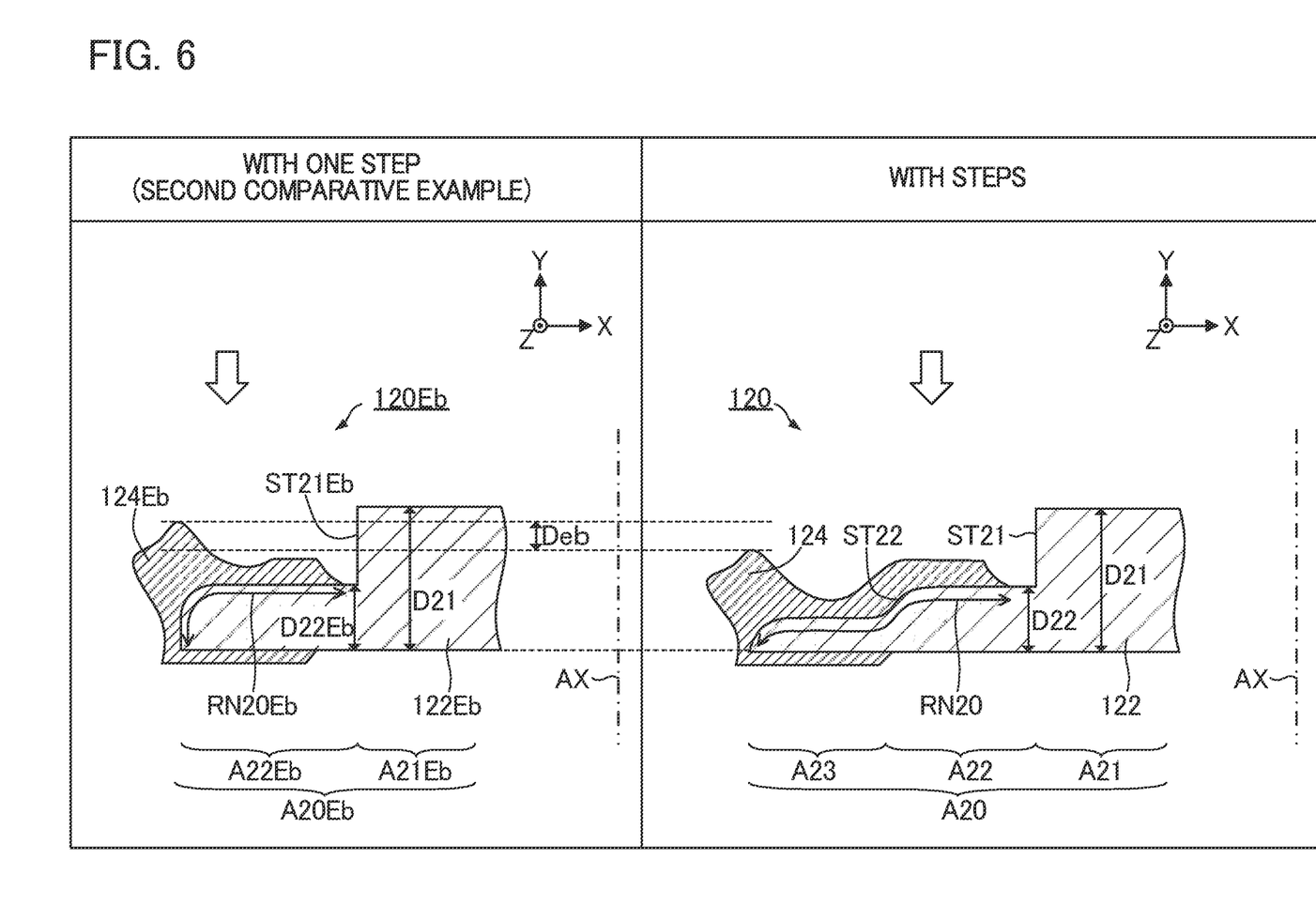
FIG. 6 is an explanatory diagram for describing differences between the canceller seal shown in FIG. 1 and a second comparative example.

FIG. 6 is an explanatory diagram for explaining the differences between the canceller seal 120 shown in FIG. 1 and the second comparative example. The white arrows in FIG. 6 indicate the direction of hydraulic pressure. A length RN20Eb in FIG. 6 is, of the adhered portion between an outer periphery sealing lip 124Eb and the cancel plate 122Eb, the length of a portion that receives hydraulic pressure, in a cross-section of the canceller seal 120Eb when cut by a plane passing through the axis AX.

In the canceller seal 120Eb of the second comparative example, there is formed only the single step ST21Eb on the edge portion A20Eb of the cancel plate 122Eb adjacent to the outer periphery. Thus, the edge portion A20Eb of the cancel plate 122Eb adjacent to the outer periphery has a first outer periphery edge portion A21Eb with a thickness D21 in the Y direction (in the direction along the axis AX) and a second outer periphery edge portion A22Eb with a thickness D22Eb that is thinner than the thickness D21 in the Y direction. In the canceller seal 120Ea, the outer periphery sealing lip 124Eb is adhered to the second outer periphery edge portion A22Eb of the edge portion A20Ea of the cancel plate 122Ea adjacent to the outer periphery, and protrudes from the second outer periphery edge portion A22Eb in the +Y direction.

The present embodiment provides substantially the same advantages over the second comparative example as those provided over the first comparative example. For example, in the present embodiment, the length RN20 corresponding to the baking area of the outer periphery sealing lip 124 is made greater than the length RN20Eb corresponding to the baking area of the outer periphery sealing lip 124Eb in the second comparative example. As a result, it is possible to increase the adhesion area between the outer periphery sealing lip 124 and the cancel plate 122 compared to that in the second comparative example. Therefore, in the present embodiment, compared with the second comparative example, it is possible to stabilize adhesion between the outer periphery sealing lip 124 and the cancel plate 122, and also to improve pressure resistance of the outer periphery sealing lip 124.

Further, for example, in the second comparative example, of the cancel plate 122Eb, a portion to which the outer periphery sealing lip 124Eb is adhered has a surface that receives hydraulic pressure, and this surface is smooth due to omission of a step. This is similar to the first comparative example. For this reason, in the present embodiment, the outer periphery sealing lip 124 is more resistant to peel off compared to the second comparative example. In other words, in the present embodiment the adhesion strength of the outer periphery sealing lip 124 and the cancel plate 122 is improved, compared to the second comparative example.

Also, in the example shown in FIG. 6, the thickness D22Eb of the second periphery edge portion A22Eb in the second comparative example is the same as the thickness D22 of the second outer periphery edge portion A22 of the cancel plate 122. Therefore, a surface that faces toward the +Y direction of the third outer periphery edge portion A23 of the cancel plate 122 is located in the −Y direction relative to a surface that faces the +Y direction of the second periphery edge portion A22Eb of the second comparative example. Therefore, in the present embodiment, the dimension in the Y direction of the outer periphery sealing lip 124 can be made smaller than that in the second comparative example. In the example shown in FIG. 6, with the canceller seal 120 it is possible to reduce the dimension in the Y direction of the outer periphery sealing lip 124 compared to the canceller seal 120Eb of the second comparative example by a length Deb.

For example, if the step ST21Eb is formed so that the thickness D22Eb of the second periphery edge portion A22Eb of the second comparative example corresponds to the thickness D23, the strength of the edge portion A20Eb of the cancel plate 122Eb adjacent to the outer periphery will be reduced compared to the present embodiment. This is because the thickness D23 is thinner than the thickness D22. In other words, in the present embodiment, it is possible to prevent or reduce degradation of the strength of the edge portion A20 of the cancel plate 122 adjacent to the outer periphery compared with a case in which the ST21Eb is formed such that the thickness D22Eb of the second outer periphery edge portion A22Eb corresponds to the thickness D23.

It is of note that the same effects are attainable with respect to the piston seal 110 as those of the canceller seal 120 described in FIGS. 5 and 6.

As described in the foregoing, in the present embodiment, the sealing device 100 is arranged in an annular recess portion CP formed in the housing 10 rotatable about the axis AX. The sealing device 100 includes an annular piston 112 movable in the Y direction along the axis AX, and an annular inner periphery sealing lip 114 that is adhered to at least a part of the edge portion A10 along the inner periphery of the piston 112 and that slides while in contact with the side surface CPb1 of the recess portion CP. The edge portion A10 includes a first inner periphery edge portion A11 having a thickness D11 in the Y direction, a second inner periphery edge portion A12 adjoining the first inner periphery edge portion A11 and having a thickness D12 that is thinner than the thickness D11 in the Y direction, and a third inner periphery edge portion A13 adjoining the second inner periphery edge portion A12 and having a thickness D13 that is thinner than the thickness D12 in the Y direction. It is of note that the first inner periphery edge portion A11, the second inner periphery edge portion A12, and the third inner periphery edge portions A13 are arranged in the order of the first inner periphery edge portion A11, the second inner periphery edge portion A12, and the third inner periphery edge portions A13, in a direction from the outer periphery to the center of the piston 112. In addition, the inner periphery sealing lip 114 is adhered to, of the edge portions A10, the third inner periphery edge portion A13 and at least a part of the second inner periphery edge portion A12 so as to cover a step ST12 formed by a difference in thickness between the second inner periphery edge portion A12 and the third inner periphery edge portion A13.

For example, the piston 112 is formed of a metallic material. The inner periphery sealing lip 114 is formed of an elastic material and is cross-linked and adhered to the piston 112. Further, for example, the edge portion A10 has a surface SF10 that includes steps ST11 and ST22 and a surface SF12 on the opposite side of the surface SF10. The step ST11 is a step formed by a difference in thickness between the first inner periphery edge portion A11 and the second inner periphery edge portion A12, and the step ST22 is a step formed by a difference in thickness between the second inner periphery edge portion A12 and the third inner periphery edge portion A13. It is of note that the surface SF10 is located between the surface SF12 and the bottom surface CPa of the recess portion CP.

As described above, in the present embodiment, the inner periphery sealing lip 114 is adhered to the third inner periphery edge portion A13 and a part of the second inner periphery edge portion A12 of the piston 112, the second inner periphery edge portion A12 having the thickness D12 thinner than the thickness D11 of the first inner periphery edge portion A11, and the third inner periphery edge portion A13 having the thickness D13 thinner than the thickness D12. The step ST12 between the second inner periphery edge portion A12 and the third inner periphery edge portion A13 is covered by the inner periphery sealing lip 114. With this configuration, in the present embodiment, since it is possible to reduce the dimension in the Y direction of the inner periphery sealing lip 114, it is possible to save space taken up by the piston 112 (piston seal 110) to which the inner periphery sealing lip 114 is adhered. Further, in the present embodiment, since the thickness D11 of the first inner periphery edge portion A11 is thicker than the thickness D12 of the second inner periphery edge portion A12 and the thickness D13 of the third inner periphery edge portion A13, it is possible to prevent or reduce degradation of the strength of the piston 112. Thus, in the present embodiment, it is possible to achieve space saving of the piston seal 110 while preventing or reducing the degradation of the strength of the piston seal 110.

Further, in the present embodiment, the sealing device 100 has an annular cancel plate 122 arranged in the recess portion CP closer to the opening of the recess portion CP than the piston 112 in the Y direction, the annular cancel plate 122 being fixed to the side surface CPb1 of the recess portion CP, and an annular outer periphery sealing lip 124 that is adhered to at least a part of the edge portion A20 along the outer periphery of the cancel plate 122 and that slides while in contact with the piston 112. The edge portion A20 has a first outer periphery edge portion A21 with a thickness D21 in the Y direction, a second outer periphery edge portion A22 adjoining the first outer periphery edge portion A21 with a thickness D22 thinner than the thickness D21 in the Y direction, and a third outer periphery edge portion A23 adjoining the second outer periphery edge portion A22 with a thickness D23 thinner than the thickness D22 in the Y direction. The first outer periphery edge portion A21, the second outer periphery edge portion A22, and the third outer periphery edge portion A23 are arranged in the order of the first outer periphery edge portion A21, the second outer periphery edge portion A22, and the third outer periphery edge portion A23 in a direction from the center to the periphery of the cancel plate 122. Further, the outer periphery sealing lip 124 is adhered to, of the outer periphery edge portion A20 of the cancel plate 122, the third outer periphery edge portion A23 and at least a part of the second outer periphery edge portion A22, to cover the step ST22 between the second outer periphery edge portion A22 and the third outer periphery edge portion A23.

For example, the cancel plate 122 is formed of a metallic material. The outer periphery sealing lip 124 is formed of an elastic material and is cross-linked and adhered to the cancel plate 122. Further, for example, the edge portion A20 has a surface SF20 that includes the steps ST21 and ST22 and a surface SF22 on the opposite side of the surface SF20. The step ST21 is a step formed by a difference in thickness between the first outer periphery edge portion A21 and the second outer periphery edge portion A22, and the step ST22 is a step formed by a difference in thickness between the second outer periphery edge portion A22 and the third outer periphery edge portion A23. The surface SF20 is located between the surface SF22 and the piston 112 in the Y direction. Thus, the surface SF20 is located between the surface SF22 and the bottom surface CPa of the recess portion CP.

As a result, in the present embodiment, similarly to the piston seal 110, it is possible to save space taken up by the canceller seal 120 while preventing or reducing degradation of the strength of the cancel plate 122 (canceller seal 120) to which the outer periphery sealing lip 124 is adhered. Therefore, in the present embodiment, it is possible to achieve space saving of the sealing device 100 while preventing or reducing degradation of the strength of the sealing device 100.

2. Modifications

The embodiment illustrated above may be variously modified. Specific modes of modifications that may be applied to the above described embodiments are illustrated below. Two or more modes freely selected from the following examples may be combined as long as they do not conflict with one another.

Modification 1

In the above-described embodiment, a mode is illustrated in which the inner periphery sealing lip 114 is adhered to the third inner periphery edge portion A13 and a part of the second inner periphery edge portion A12 of the piston 112. However, the present invention is not limited thereto. For example, the inner periphery sealing lip 114 may be adhered to the second inner periphery edge portion A12 and the third inner periphery edge portion A13 of the piston 112. That is, the inner periphery sealing lip 114 may be provided so as to be adhered to the second inner periphery edge portion A12 up to the step ST11 between the first inner periphery edge portion A11 and the second inner periphery edge portion A12 and not to cover the first inner periphery edge portion A11. In this case, it is possible to increase the adhesion area between the inner periphery sealing lip 114 and the piston 112 compared with a case in which the inner periphery sealing lip 114 is adhered to the third inner periphery edge portion A13 and a part of the second inner periphery edge portion A12 of the piston 112. As a result, according to Modification 1, it is possible to stabilize adhesion of the inner periphery sealing lip 114 to the piston 112, and to improve pressure resistance of the inner periphery sealing lip 114.

The outer periphery sealing lip 124 may be adhered to the second outer periphery edge portion A22 and the third outer periphery edge portion A23 of the cancel plate 122. That is, the outer periphery sealing lip 124 may be provided to be adhered to the second outer periphery edge portion A22 up to the step ST21 between the first outer periphery edge portion A21 and the second outer periphery edge portion A22 and not to cover the first outer periphery edge portion A21. It is possible to increase the adhesion area between the outer periphery sealing lip 124 and the cancel plate 122 in this case as well, thereby stabilizing the adhesion between the outer periphery sealing lip 124 and the cancel plate 122 and improving the pressure resistance of the outer periphery sealing lip 124.

Modification 2

In the above-described embodiment and Modification 1, an example is given of a case in which the sealing device 100 has a piston seal 110 and a canceller seal 120. However, the present invention is not limited thereto. For example, of the edge portion A10 of the piston 112 adjacent to the inner periphery and the edge portion A20 of the cancel plate 122 adjacent to the outer periphery, only the edge portion A10 may have steps ST11 and ST12 formed therein, or only the edge portion A20 may have steps ST21 and ST22 formed therein. In this case also, since space taken up by one of the piston seal 110 and the canceller seal 120 can be saved, it is possible to achieve space saving of the sealing device 100 while preventing or reducing degradation of the strength of the sealing device 100.

The invention claimed is:

1. An annular sealing device arranged in an annular recessed groove formed in a storage member rotatable about an axis, the sealing device comprising:
    an annular first body portion movable in an axial direction along the axis; and
    an annular first sealing lip portion that is adhered to at least a part of a first edge portion along an inner periphery of the first body portion and that slides while in contact with an inner periphery surface of the recessed groove,
    wherein:
    the first edge portion includes:
        a first portion with a first thickness in the axial direction;
        a second portion adjoining the first portion and with a second thickness that is thinner than the first thickness in the axial direction; and
        a third portion adjoining the second portion and with a third thickness that is thinner than the second thickness in the axial direction,
    the first portion, the second portion, and the third portion are arranged in a direction from an outer periphery to a center of the first body portion in order of the first portion, the second portion, and the third portion, and
    the first sealing lip portion is adhered to, of the first edge portion, the third portion and at least a part of the second portion, to cover a step formed by a difference in thickness between the second portion and the third portion, and the first sealing lip portion does not cover the first portion.

2. The sealing device according to claim 1, wherein in the second portion, the first sealing lip portion is in contact with a step formed by a difference in thickness between the first portion and the second portion.

3. The sealing device according to claim 1,
    wherein:
    the first edge portion has a first surface and a second surface on an opposite side of the first surface, wherein the first surface includes a step formed by a difference in thickness between the first portion and the second portion and the step formed by the difference in thickness between the second portion and the third portion, and
    the first surface is located between the second surface and a bottom surface of the recessed groove.

4. The sealing device according to claim 1, further comprising:
    an annular second body portion arranged in the recessed groove and closer to an opening of the recessed groove than the first body portion in the axial direction, the annular second body portion being fixed to the inner periphery surface of the recessed groove; and an annular second sealing lip portion that is adhered to at least a part of a second edge portion along an outer periphery of the second body portion and that slides on the first body portion, wherein:

the second edge portion includes:
- a fourth portion with a fourth thickness in the axial direction;
- a fifth portion adjoining the fourth portion and with a fifth thickness that is thinner than the fourth thickness in the axial direction; and
- a sixth portion adjoining the fifth portion and with a sixth thickness that is thinner than the fifth thickness in the axial direction, the fourth portion, the fifth portion, and the sixth portion are arranged in a direction from a center to the outer periphery of the second body portion in order of the fourth portion, the fifth portion, and the sixth portion, and the second sealing lip portion is adhered to the sixth portion and at least a part of the fifth portion of the second body portion, to cover a step formed by a difference in thickness between the fifth portion and the sixth portion of the second edge portion.

5. The sealing device according to claim 4, wherein the second sealing lip portion is arranged in the fifth portion in contact with a step formed by a difference in thickness between the fourth portion and the fifth portion and not to cover the fourth portion.

6. The sealing device according to claim 4, wherein:

the second edge portion has a third surface and a fourth surface on an opposite side of the third surface, wherein the third surface includes a step formed by a difference in thickness between the fourth portion and the fifth portion and the step formed by the difference in thickness between the fifth portion and the sixth portion, and the third surface is located between the fourth surface and the first body portion in the axial direction.

7. An annular sealing device arranged in an annular recessed groove formed in a storage member rotatable about an axis, the sealing device comprising:

an annular body portion arranged in the recessed groove and closer to an opening of the recessed groove than an annular piston arranged in the recessed groove in an axial direction along the axis, the annular body portion being fixed to an inner periphery surface of the recessed groove; and an annular sealing lip portion that is adhered to at least a part of an edge portion along an outer periphery of the body portion and that slides while in contact with the piston, wherein:

the edge portion has:
- a fourth portion with a fourth thickness in the axial direction;
- a fifth portion adjoining the fourth portion and with a fifth thickness that is thinner than the fourth thickness in the axial direction; and
- a sixth portion adjoining the fifth portion and with a sixth thickness that is thinner than the fifth thickness in the axial direction, the fourth portion, the fifth portion, and the sixth portion are arranged in a direction from a center to the outer periphery of the body portion in order of the fourth portion, the fifth portion, and the sixth portion, and the sealing lip portion is adhered to, of the edge portion, the sixth portion and at least a part of the fifth portion to cover a step formed by a difference in thickness between the fifth portion and the sixth portion.

8. The sealing device according to claim 7, wherein the sealing lip portion is arranged in the fifth portion in contact with a step formed by a difference in thickness between the fourth portion and the fifth portion and not to cover the fourth portion.

9. The sealing device according to claim 7, wherein:

the edge portion has a third surface and a fourth surface on an opposite side of the third surface, wherein the third surface includes a step formed by a difference in thickness between the fourth portion and the fifth portion and the step formed by the difference in thickness between the fifth portion and the sixth portion, and the third surface is located between the fourth surface and the piston in the axial direction.

\* \* \* \* \*